March 26, 1968     E. L. ROGERS     3,374,844
APPARATUS AND METHOD FOR WEIGHING RAILROAD CARS IN MOTION
Filed Oct. 22, 1965     5 Sheets-Sheet 1
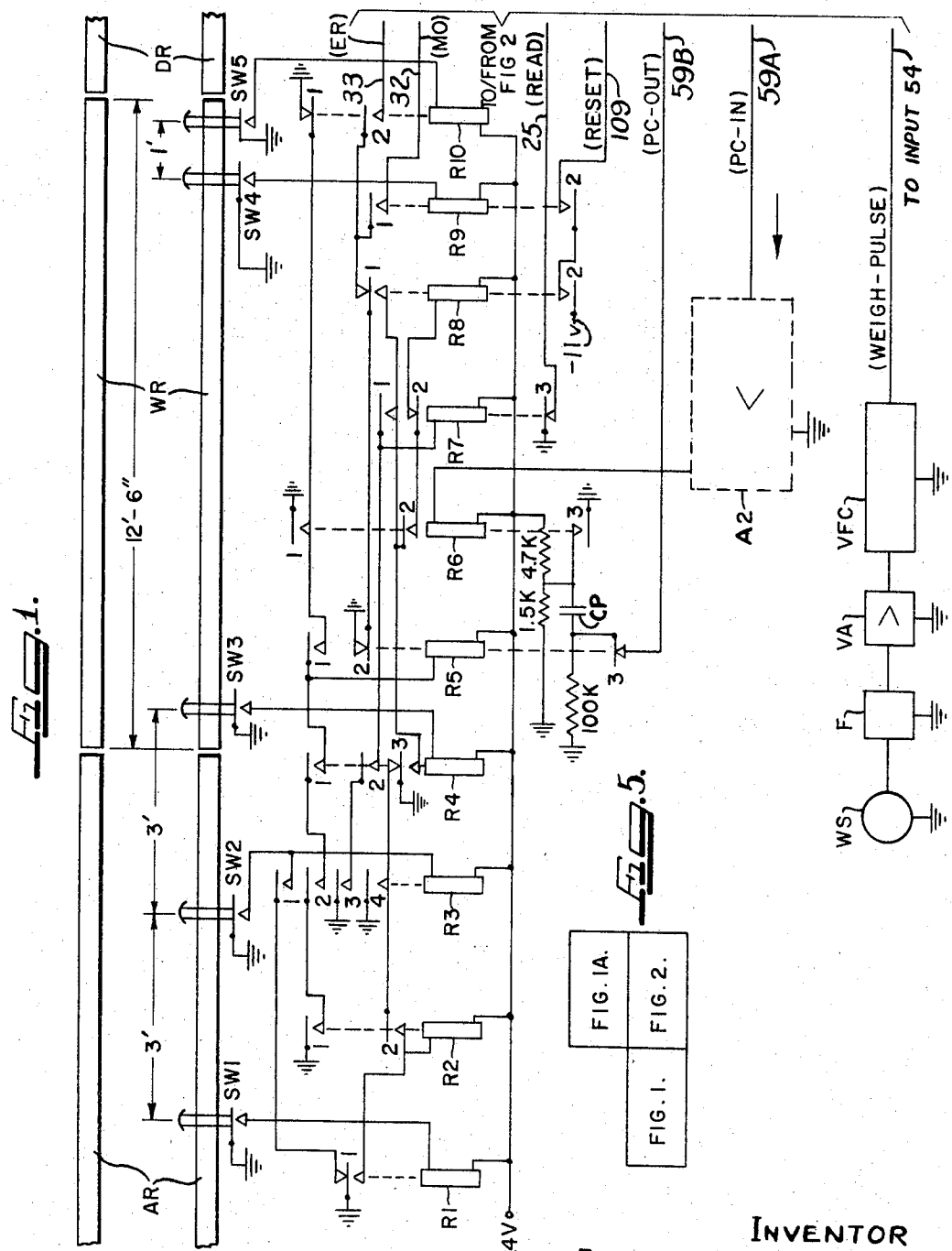
INVENTOR
EDWARD LAURENCE ROGERS
by: Morris Spector
ATTY.

March 26, 1968

E. L. ROGERS 3,374,844

APPARATUS AND METHOD FOR WEIGHING RAILROAD CARS IN MOTION

Filed Oct. 22, 1965

INVENTOR
EDWARD LAURENCE ROGERS

BY *Morris Spector*

ATTORNEY

United States Patent Office 3,374,844
Patented Mar. 26, 1968

3,374,844
APPARATUS AND METHOD FOR WEIGHING RAILROAD CARS IN MOTION
Edward Laurence Rogers, Chicago, Ill., assignor to Railroad Machinery Development Corporation, Northfield, Ill., a corporation of Ohio
Continuation-in-part of application Ser. No. 365,470, May 6, 1964. This application Oct. 22, 1965, Ser. No. 501,391
21 Claims. (Cl. 177—134)

This application is a continuation-in-part of my co-pending application Ser. No. 365,470, filed May 6, 1964, now abandoned, and relates to the weighing of objects as they move past the weighing station, particularly vehicles.

Freight cars are frequently weighed in motion while they are coupled together in a train, the weighing being frequently performed by separately weighing the different wheeled components of the car. It is an object of this invention to provide such a weighing system with an improved means for assuring proper weighing of a train of mixed cars some of which have three-axle trucks and others of which have two-axle trucks.

When the respective cars of a moving train are each weighed in two (or more) steps, and the total for each car is to be ascertained, it is essential that appropriate ones of each pair of weighings be added together. In the event of a malfunctioning of the system that results in skipping of the weighing of one truck of a car, for instance, due to a mis-triggering action, it is important that the error be indicated immediately, for otherwise each next pair of trucks weighed will not be trucks of the same car and it will be erroneous to add these two weights. It is therefore an object of the present invention to provide a system which will recognize a missed weighing action and will automatically re-synchronize itself before the departure from the scale of the car on which the weighing of one of the components was missed. The functions are such that a weight print-out will occur for the weight of this car, which print-out indicates an error (as by printing the number zero), but nevertheless corrections are made so that the succeeding weighings are properly grouped so that each following group consists of the weights of the trucks or other components of the same car.

It is a further object of this invention to provide a weighing system wherein the weights exerted by the respective trucks or other wheel components of each railroad car are ascertained and recorded separately or in total for each freight car, and wherein the system discriminates in its totalization as to the wheel components of one car and the wheel components of all the other cars, so that each recorded total is the weight of the components of a car being weighed.

It is a further object of this invention to provide a system of the above mentioned character wherein an error in the selection of the component car weights that are to be totalized is detected and is indicated. It is a still further object of this invention to provide means for automatically correcting against continuing that error on the weighings of the subsequent cars.

It is a further object of this invention to provide an improved and simplified means for differentiating as between an engine and a freight car that is passing over the weigh rail, so that the engine will not cause a malfunctioning of the weighing operation.

It is a further object of this invention to provide a scale having the above features combined with a system wherein a signal is given of the speed of the train of cars being weighed, to apprise the engineer when and if it is safe to increase the train speed, and another signal is given to indicate an incipient overspeed whereby the train engineer is informed that he may no longer safely increase the speed of the train.

In the drawings:
FIG. 1 is a diagrammatical representation of the track-controlled portion of the present invention;
FIG. 1a is a circuit of a signal control system used in connection with the circuit of FIG. 1;
FIG. 2 is a schematic diagram of the connection between the components of the computer thereon indicated;
FIG. 3 is a detailed circuit diagram of the logic card for the "read" computing unit and the connections thereto;
FIG. 4 is a circuit similar to FIG. 3 for the gate amplifier; and
FIG. 5 is a schematic illustration showing the relationships of FIGS. 1, 1a and 2.

General description

FIG. 1 shows a section of railroad track comprising approach rails AR, weigh rails WR, and departure rails DR, at a weigh station. Each car of a train of conventional railroad freight cars is weighed in two draft, while coupled to adjacent cars in motion. For this purpose, the weigh rails WR are each 12 feet 6 inches long. They are physically interconnected to constitute one rigid structure and are separate from the approach and departure rails AR and DR. There is provided weight-sensing apparatus WS which causes a voltage to be produced proportionate to the weight currently on the weigh rails WR. The weight-sensing apparatus may comprise a number of strain gauges or other types of load-responsive transducers, which are actuated by the weight on the weigh rails. One standard manner of connecting the strain gauges is a balanced Wheatstone Bridge that is unbalanced by the weight on the weigh rails, producing a voltage between opposite terminals of the bridge which is proportionate to that weight at any instant. The voltage from the bridge is filtered through a low pass filter F which filters out the high frequency oscillations and reduces the amplitude of the low frequency oscillations which arise from vibrations caused by the truck of the car rolling onto rails WR, thus eliminating most of the errors due to mechanical vibrations. The high frequency vibrations are those above approximately 10 cycles per second, and the low frequency vibrations referred to are those up to approximately 10 cycles per second. The filtered voltage is fed to an amplifier VA, which supplies a proportionate amplified voltage to a voltage to frequency converter VFC. The filtering of the output voltage of the bridge that is above referred to may be done before or after amplification of the voltage. The frequency converter VFC produces a train of positive pulses of a frequency proportional to the received weigh-signal voltage, and therefore proportional to the weight on weigh rails WR. The variable frequency weigh-pulse train is delivered over weigh conductor 54 and is utilized as hereinafter described.

After a truck to be weighed is on the weigh rail, the actual weighing is delayed for a fixed time which, in a preferred embodiment of the present invention, is of the order of .5 second. It is then weighed by measuring the filtered voltage. This is done by integrating the output of the frequency converter VFC for a fixed period of time which, in the preferred embodiment of the invention, is of the order of .2 second.

In FIG. 1, the direction of movement of a train of cars to be weighed is assumed to be from left to right. The wheel-operated control switches SW1 to SW5 are positioned along the track accordingly, and their spacings are substantially as indicated. These spacings, together with the illustrated circuit arrangement of the associated trackside relays R1 to R10, are based on the standard characteristics of modern American freight-train rolling stock: Each rolling-stock item has a front and a rear supporting truck, with either two axles or three axles per truck. The following center-to-center dimensions are substantially invariable:

(1) On any freight-car truck, the distance between adjacent axles is more than 3 feet and less than 6 feet;

(2) On any 3-axle freight-car truck, the distance between the front axle and the rear axle is more than 6 feet and is less than 11.5 feet;

(3) On any freight car, the distance from the inside axle of one truck to the inside axle of the other truck is greater than 11.5 feet;

(4) Between adjacent freight cars of a train, the distance from the nearest axle of one car to the nearest axle of the adjacent car is greater than 6 feet; and (5) On each locomotive truck, at least one axle is more than 6 feet from the nearest other axle.

Each of the switches SW1 to SW5 is normally open as shown, and is arranged to be closed temporarily by the rim (or flange) of the wheel of any axle rolling over the rail along side of which the switch is located.

The preferred inter-switch distance is the indicated 3 feet between SW1 and SW2, and between SW2 and SW3, with SW1 and SW2 being along an approach rail AR, and with SW3 being very near the approach end of a weigh rail WR (12.5 feet long).

The trackside equipment of FIG. 1 is connected to the weigh-control equipment of FIG. 2 by seven control conductors comprising read, marginal-overspeed, and error conductors 25, 32 and 33, reset and print-command conductors 109, 59A and 59B, and weigh-pulse conductor 54.

In FIG. 2, the noted weigh-pulse frequency over conductor 54, from the weigh station of FIG. 1 is connected to gate amplifier 45. In a preferred example, converter VFC may provide a pulse train over conductor 54 of 100,000 pulses per second for each 100,000 pounds on the weigh rails WR, which is one pulse per second for each one pound of weight.

Briefly, gate amplifier 45 is maintained normally insensitive to pulses over weight-proportional conductor 54 until digital clock structure 43 has counted off crystal-controlled clock pulses for a substantial fraction of a second (.5 second in the preferred example) following a signal from FIG. 1 that a freight car truck to be weighed is fully supported on the weigh rails WR, thus delaying counting responsive to the weight-indicating pulse train for .5 second during which time the filter F has had time to respond fully, and the heaviest vibration induced fluctuations in the weight signal have subsided. Then structure 43 places a start signal on conductor 53, which is coincident with a gate signal over conductor 42 to gate 45 from read circuit 39. Thereupon, amplifier 45 is rendered sensitive to pass weight-proportional frequency pulses from conductor 54 to conductor 55, the input to the decade counter 52. Such pulses pass to counter 52 for a preset short weighing interval (.2 second in the preferred example), at the end of which control-click 43, having been reset to zero coincident with the start signal on conductor 53, reaches its preset count to send a weigh-stop signal over conductor 60, which signal again renders amplifier 45 insensitive to pulses on conductor 54, terminating the pulse train to the weight pulse-train counter 52, leaving that counter set to a reading indicative of the weight of the freight-car truck currently rolling over weigh rails WR of FIG. 1. The weight indicated on counter 52 is printed, responsive to a print command over conductor 56 from amplifier 45, either separately for each truck or is totalled for the two trucks of a car, according to the setting of arms 206, 207 of switch 205, associated with reset circuit 44.

*Detailed description*

Figure 1A:
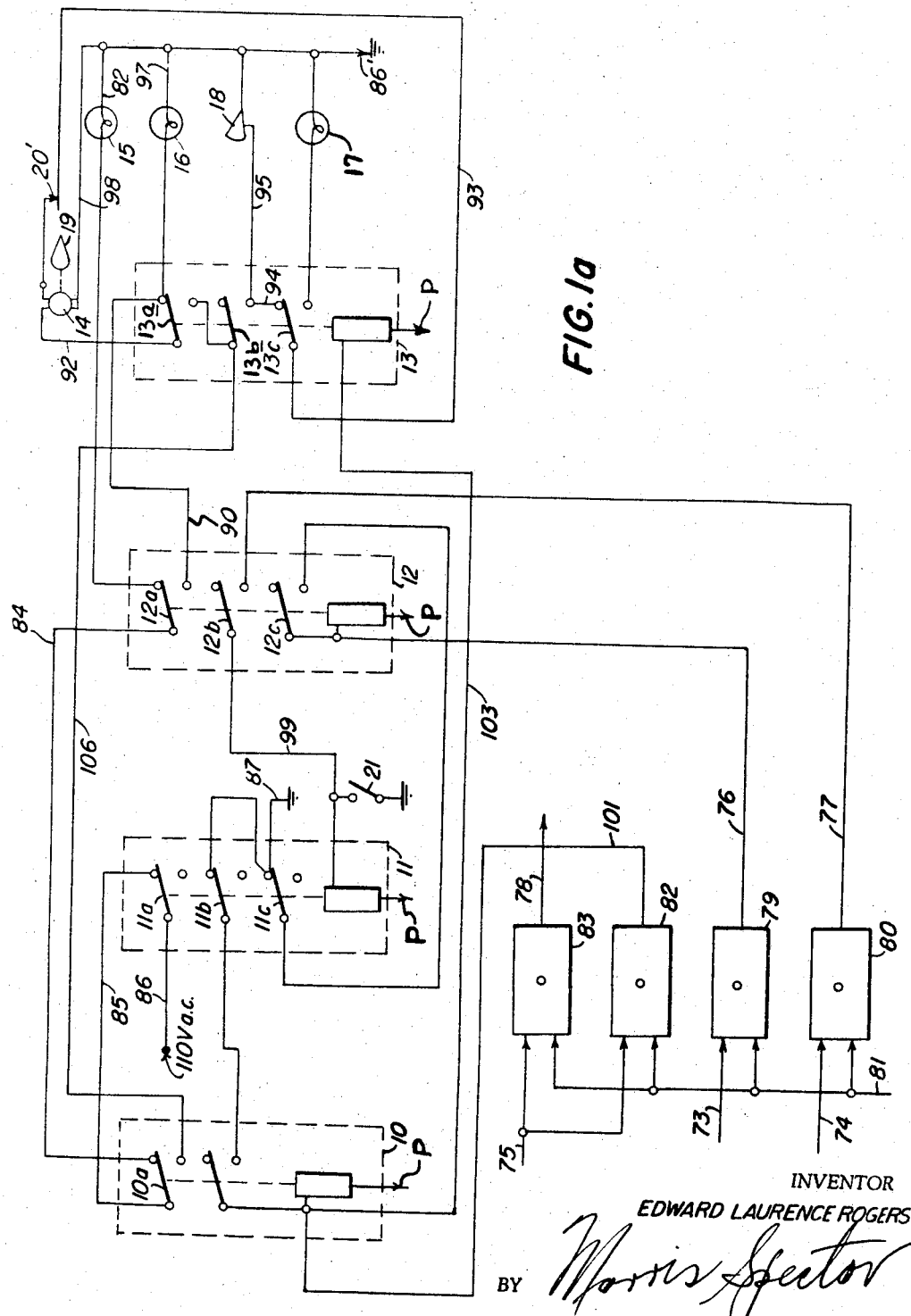
Figure 2:
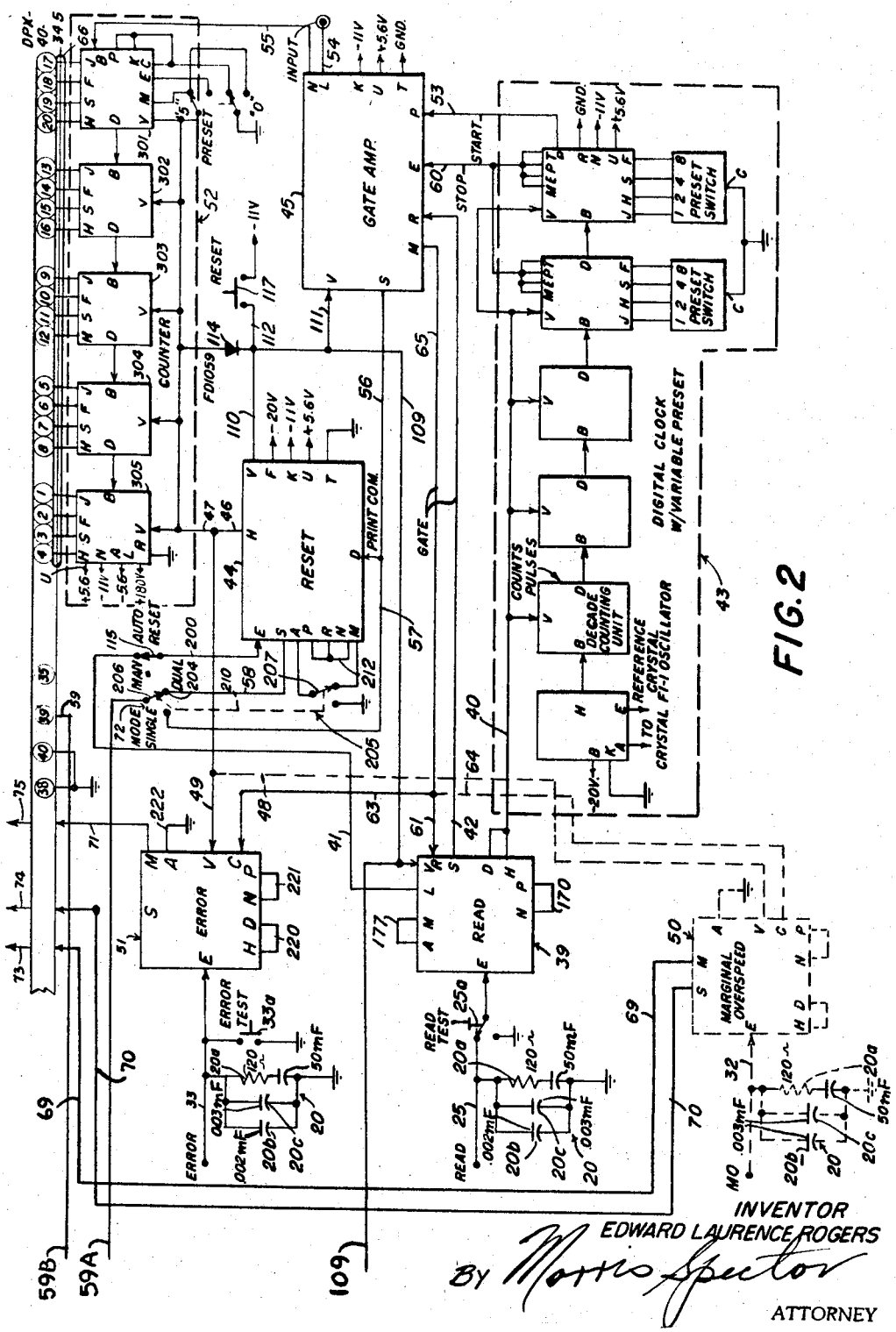

Referring to FIGS. 1, 2, and 1A, assembled as shown in FIG. 5, a weighing operation may proceed as follows.

Normally, all switches SW1 to SW5 of FIG. 5 are open, and all relays R1 to R10 are restored.

If a train of freight cars to be weighed approaches the weigh station (from the left), and if, for example, the locomotive moving it is behind the train, nothing happens at the weigh station until the leading wheel of the leading truck of the first car of the train reaches and actuates switch SW1, momentarily closing SW1.

(1) Relay R1 now operates from ground at the closed switch SW1, operating relay R2. R2 locks at its contacts 2 to ground at back contact 3 of R4. When the lead wheel passes off switch SW1, relay R1 restores, leaving relay R2 locked operated.

(2) The said lead wheel rolls onto, and closes switch SW2 before the next wheel of the lead truck reaches SW1, operating relay R3. At its contacts 1, relay R3 locks to ground at back contact 1 of restored relay R1; and, at its contacts 4, it closes a new locking circuit for R2. Nothing happens when the lead wheel of the lead truck rolls off of and opens SW2, since R3 is now locked operated, along with relay R2.

(3) Before the lead wheel of the lead truck reaches SW3, the second wheel of such truck recloses SW1, reoperating relay R1 to unlock and restore relay R3. When the second wheel rolls off of SW1, relay R1 restores again, leaving relay R2 again held locked operated alone.

(4) Next, the said lead wheel operates SW3, while the second wheel is between SW1 and SW2. Relay R4 thereupon operates. Its back contact 3 unlocks and restores R2, leaving relay R4 operated alone. A moment later, relay R4 restores, when SW3 again opens, leaving all of the trackside relays R1 to R10 again restored.

(5) When the second wheel of the truck reaches and operates SW2 (while the leading wheel is between SW3 and SW4), relay R3 reoperates, again locking itself operated at its contacts 1, to ground at back contact 1 of the restored relay R1, wherefore locked relay R3 remains operated alone when the said second wheel permits SW2 to open.

(6) Next, the second wheel of the lead truck reaches and closes SW3, reoperating relay R4, this time with relay R3 held locked operated if the currently passing freight car is one having 2-axle trucks. Thus, relays R3 and R4 are now both operated. Read-control relay R7 is therefore operated, through contacts 3 of R3 and contacts 2 of relay R4. At its contacts 1, R7 locks itself to ground at front contact 3 of R4; at its contacts 2, it disconnects R8; and, at its contacts 3, it disconnects ground from read-control conductor 25, thereby preparing to send a weigh-cycle-start pulse to structure 39 of FIG. 2. When the noted second wheel passes off switch SW3, relay R4 restores. Its contacts 2 open the operating circuit of R7, and its front contact 3 opens the locking circuit thereof. Read-control relay R7 responsively restores; and its contacts 3 again ground read-control conductor 25 to signal the start of a weighing cycle. Relay R3 again stands operated alone, and both axles of the lead truck of the freight car are supported on the weigh rails WR, signalling the weight of the truck to the weight-sensing device WS.

*Three axle operation*

(5′) If the freight car now passing the weigh station has 3-axle (rather than 2-axle) trucks, a third wheel (on the third axle of the truck) closes SW1 while the second wheel is between SW2 and SW3, with the first wheel between SW3 and SW4, and with relay R3 locked operated alone. Relay R1 is thus operated a third time, again operating relay R2 (which locks), unlocking and restoring relay R3, leaving relays R1 and R2 operated. When the noted third wheel permits SW1 to reopen, R1 is again restored, leaving relay R2 locked operated alone, at back contact 3 of relay R4.

(6′) When the noted second wheel reaches and closes SW3, relay R4 operates again, its back contact 3 unlocking and restoring relay R2. When the second wheel permits SW3 to reopen, R4 restores again, leaving relays R1 to R10 all restored.

(7) When the trailing third wheel operates SW2, relay R3 operates and again locks to ground at back contact 1 of relay R1, wherefore it remains locked operated after the third wheel lets SW2 reopen. R3 then stands locked operated alone.

(8) When the trailing third wheel of the truck reaches the weigh rail WR and closes switch SW3, relay R4 operates, with R3 held locked operated. Contacts 3 of R3 and contacts 2 of R4, in series, operate read-control relay R7, which temporarily ungrounds read conductor 25 preparatory to a weighing-cycle-start pulse. When the noted third wheel again permits SW3 to open, R4 restores, open-circuiting and restoring relay R7, leaving R3 locked operated alone. At contacts 3 or R7, read conductor 25 is again grounded to send a signal over read conductor 25 to start a weighing cycle.

Weighing cycle

During the weighing cycle, the two wheels (or the three wheels, as the case may be) of the noted front truck are rolling to the right on rails WR toward overspeed control switches SW4 and SW5. Throughout the weighing cycle, all wheels of the front truck of the lead car are supported on weigh rails WR with the weight-sensing device WS supplying a voltage proportionate to the truck weight on weigh rails WR, which voltage is filtered at F and amplified at VA to supply a weight-proportioned voltage to voltage-to-frequency converter VFC, which responsively supplies a proportional-to-weight frequency (such as 100,000 cycles per second per 100,000 pounds weight) to weight-pulse conductor 54.

In the apparatus of FIG. 2, the read circuit 39, as well as marginal-overspeed and error circuits 50 and 51, has an input circuit arrangement 20. It comprises .002 micro-farad and .003 micro-farad condensers (or capacitors) 20b and 20c between the input conductor and ground and a third path to ground through the 120 ohm resistor 20a and the illustrated 50 micro-farad condenser, in series.

Figure 3:
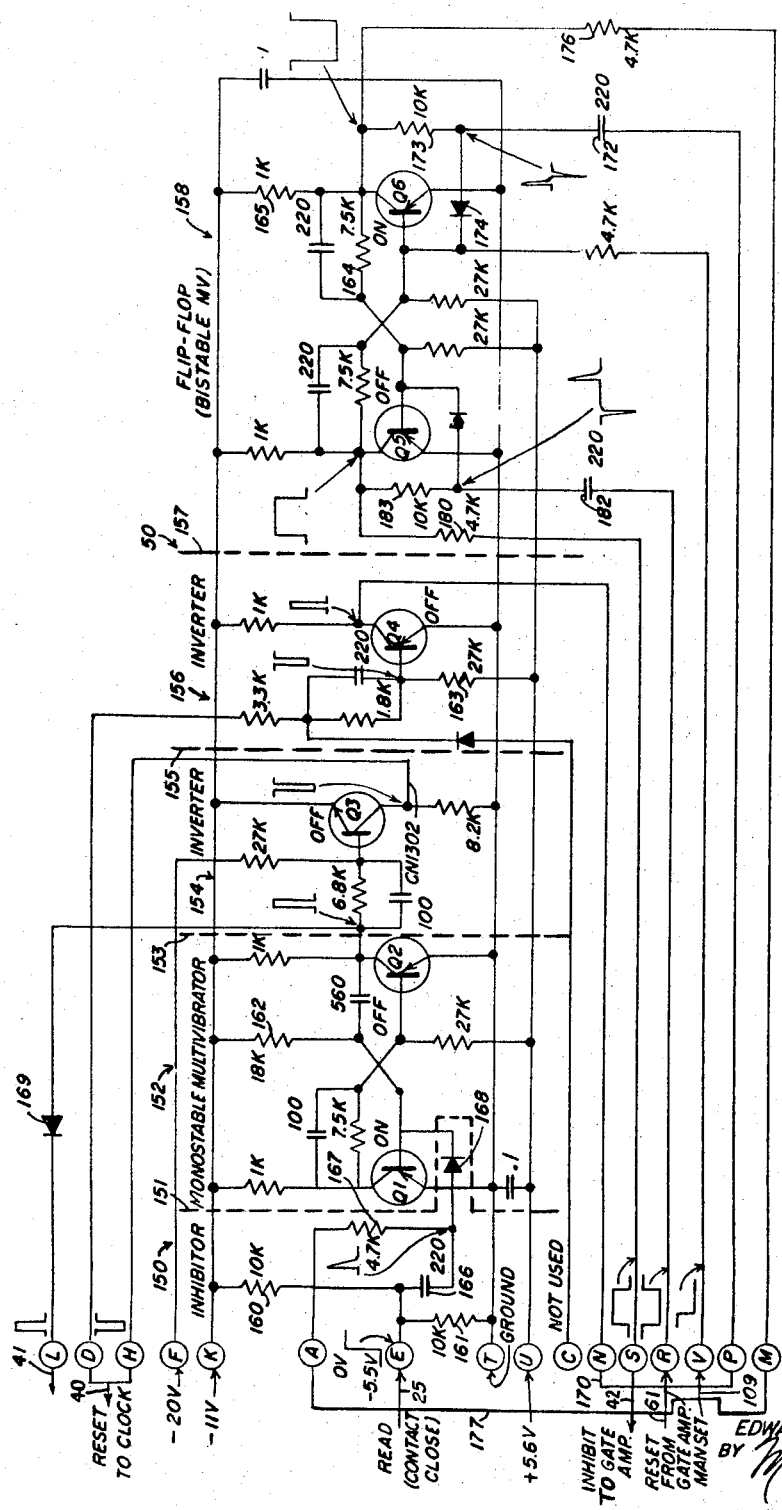
Figure 4:
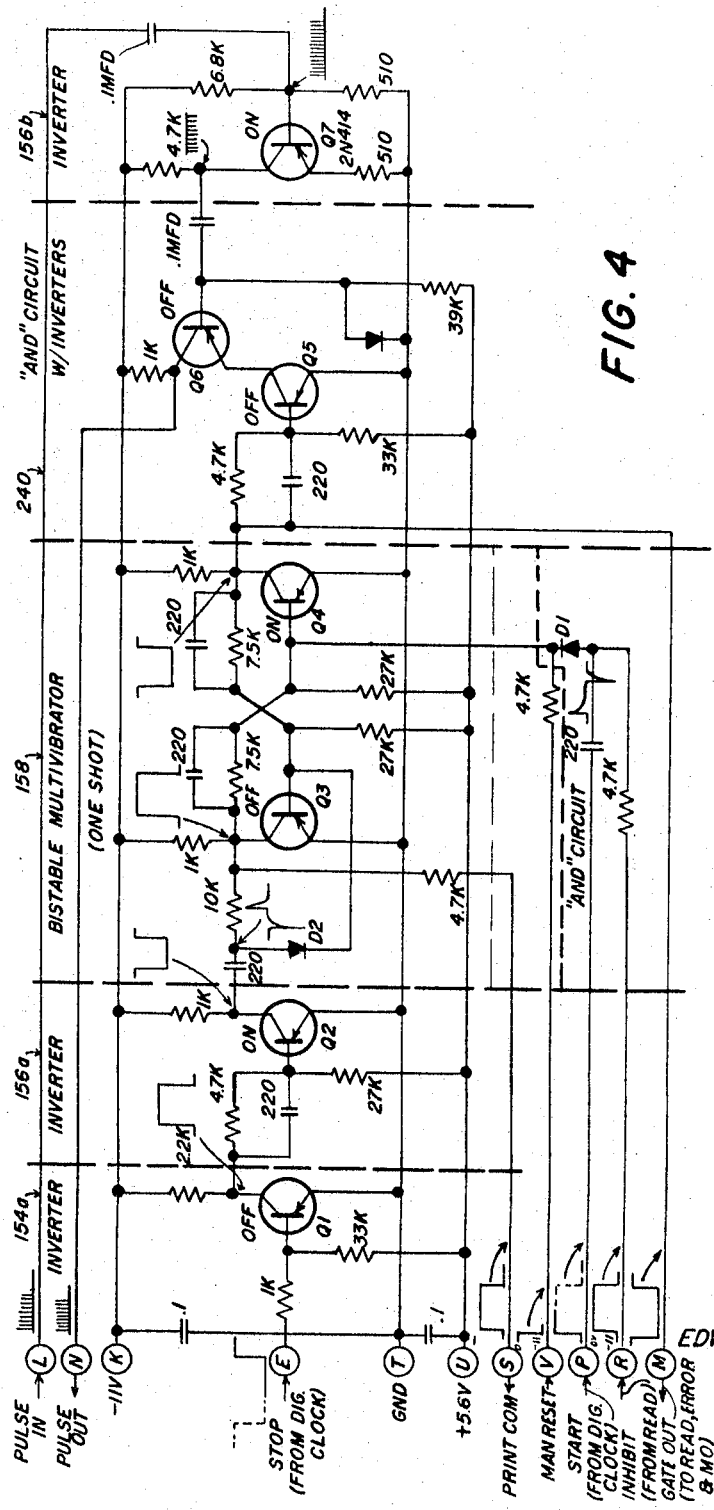

Referring to FIGS. 2 to 4, the capacities of the respective illustrated condensers (or capacitors) are given in microfarads in FIG. 2 and in micro micro-farads in FIGS. 3 and 4, and the resistances of the respective resistors are given in ohms. For resistances of more than 1000 ohms, the resistance indication ends with the letter "K" to indicate 1000. Examples are resistors 160, 161, and 165 of FIG. 3.

As explained later in connection with FIG. 3, the described preparatory ungrounding of read conductor 25 when the trailing axle of the truck being weighed rolls upon the weigh rails WR and closes switch SW3, the resulting described operation of relay R7 to unground conductor 25 permits a negative potential to build up thereon in preparation for starting a weigh cycle. When relays R4 and R7 subsequently restore upon the opening of SW3 by the trailing wheel, causing R7 to again ground conductor 25, the negative potential on conductor 25 is abruptly dissipated to ground, sending a relatively positive cycle-start pulse to read circuit 39. Read circuit 39 responsively generates respective output pulses on conductors 40 and 41, and places a gating potential on conductor 42.

The pulse on conductor 41 activates reset circuit 44 to transmit a reset pulse over conductor 46 and its connected conductors 47, 48, and 49, whereby marginal overspeed circuit 50 and error circuit 51 are reset over conductors 48 and 49. The five digital counters 301 to 305 of decade conunter 52 are concurrently reset to zero over conductor 47.

The reset pulse on joined conductors 46 to 49 is prevented from reaching conductors 109 to 112 by blocking diode 114.

The reset pulse over conductor 40 (from 39) resets each of the five counters of crystal-controlled timing clock 43 to its reset value, which is zero. This clock includes these counters and the oscillator shown to the left of the first counter. Through a controlling crystal, to which the connections are indicated below the oscillator, this oscillator delivers an alternating current of substantially unvarying frequency to the decade counter of 43, which now advances from its reset value toward full count, during which operation it introduces a delay interval of (for example) .5 second. During this .5 second delay interval, the vibrations caused by the truck to be weighed rolling onto weigh rails WR have time to largely subside.

At the end of the .5 second delay interval counted by structure 43, the decade counter within 43 reaches full count, whereupon it spills over and resets to zero, and continues to count its control oscillator cycles to provide a weighing interval of .2 second (for example). Concurrently with the spill over and resetting of 43 at the end of the delay interval, circuit 43 sends a start pulse over conductor 53 to gate amplifier 45. This start pulse, with the noted gating potential held on conductor 42 by read circuit 39 changes over and opens normally inactive gate amplifier 45 to pass the weigh pulses received over conductor 54 to input count conductor 55 of the weight-pulse counter 52, which has been reset to zero as described. At this time, gate amplifier 45 places a gate signal on conductor 65 and its connected conductors 61, 63, and 64. Moreover, gate amplifier 45 places a relatively positive preliminary print-command potential on conductor 56.

The pulses counted by decade counter 52 are of a frequency proportional to the weight of the truck now supported on, and rolling across, weigh rails WR of the weigh station, as described. If some small vibration remains in the weigh rails and their supporting structure, the average weight-indicating frequency remains unchanged thereby as small periods of greater frequency are balanced by similar small periods of lesser frequency.

Following the noted spill over and reset of the timing decade of counter 43, such counter counts to a preset value determined by the two preset switches shown at the lower right within 43. When such preset count value is reached (at the end of .2 second, for example), the decade counter within 43 places a stop signal on conductor 60 which resets gate amplifier 45 to close the gate between pulse conductors 54 and 55, which stops the count of weigh-record decade counter 52. The count left standing on counter 52 indicates the weight of the freight-car truck now about to roll off the weigh rails at the weigh station. The noted count is visually indicated on counters 301 to 305 of weight counter 52.

A cable 66 leads to a print-out device (not shown) from the digit counters 301 to 305 of 52. Such print-out device preferably prints on tape the current setting of the counters at 52 each time it receives a print command, over conductor 59B, such commands being issued as hereinafter described.

The noted reset of gate amplifier 45 to terminate the above accurately measured .2 second weight-count interval, removes the noted gate signal from conductor 65 and its connected conductors 61, 63, and 64. Removal of such gating signal resets read circuit 39, and closes "and" gates in respective control circuits 50 and 51.

The noted resetting of gate circuit 45 replaces the relatively positive preparatory print-command potential on conductor 56 by a negative print-command potential. The effect of these potentials on conductor 56 depends on the setting of mode switch 205, associated with reset structure 44.

Single-mode print-out

If the mode switch 205 is set to alternate position (single mode) with each of its arms 206, 207 rotated one notch clockwise, each truck-weighing count on counters 52 is to be printed separately on the record tape of the printer, and the tape is to be advanced one step for each such truck-weight printing. In this event, print-command conductor 57 (joined to 56) is switched into connection with print-command conductor 59A by switch arm 206. The preliminary positive potential print-command on conductor 59A reaches the input of a relay driver A2 (FIG. 1) which is an amplifier that upon command of that impulse supplies sufficient power to operate a print-command relay R6. The output print-command conductor 59B is normally held at an effective ground potential through contacts 3 of relay R5 and the associated 100K resistor. An associated 0.1 micro-fared condenser CP (FIG. 1) thus normally stands with its right hand terminal charged to about 6 volts negatively, to ground, by its connection to the junction of the serially related 4.7K ohm and 1.5K ohm resistors. When relay R6 operates, its contacts 3 ground the right-hand terminal of a condenser CP, sending a positive preparatory print-command pulse over conductor 59B to terminal 39' of FIG. 2, whence it reaches the noted printer. This positive preparatory pulse to the printer does not cause it to print, as it is arranged to print only on a negative signal over conductor 59B.

When the gate amplifier 45 replaces the preparatory relatively positive potential on conductor 56 (and its now joined conductors 57 and 59A) with the noted negative print-command potential, amplifier and relay driver A2 is deactivated, restoring relay R6. Thereupon. contacts 3 disconnect ground from the junction of the associated resistors, whereupon a substantially 6-volt negative potential appears at such juncture, sending a negative print-command pulse over conductor 59B and through terminal 39' to the printer, causing it to print the value of the truck-weight count standing on counter 52, and signalled to the printer over cable conductors 66 (FIG. 2). As noted, the printer prints on tape and advances the tape after every printing operation. A similar printing operation is performed for each truck which is weighed while mode switch 205 is set in its alternate, or single mode, position.

Dual-mode print-out

When switch 205 is set with its switch blades 206, 207 in their illustrated position, conductor 59A is disconnected from conductor 57, wherefore no print-out operation is to occur as a result of the described weighing of the front truck of a car. Instead, reliance is had on the weigh-counting of reset circuit 44. Then, when the described preliminary positive print-control pulse is placed on conductor 56 by amplifier 45 and reaches reset circuit 44 through its terminal D, it causes a flip-flop device (such as 158 of FIG. 3) to change over in circuit 44, to mark completion of the weighing of the first truck of the car. A preparatory positive print-command is thereby placed on terminal S of reset circuit 44, such potential traversing conductor 58, switch blade 206, and conductor 59A to activate relay-driver amplifier A2. Print-control relay R6 is thereby operated, as a preparatory step, and it remains operated until the rear truck of the car has been weighed by operations as described for the front truck thereof.

When the rear truck has been weighed, the counters 52 have been additionally set, by weigh pulses over conductors 54 and 55 to add the weight count of the second truck of the car to that of the first truck thereof. Then, gate amplifier 45 again acts to send a positive print-command signal over conductor 56 to terminal D of device 44, which causes the noted flip-flop device in reset circuit 44 to change over again, this time back to its original condition. Thereby a negative print-command signal is sent over conductor 58, switch blade 206, and conductor 59A, to reach and deactivate amplifier A2. The operated relay R6 is thereby restored, acting as described to send an effective negative print-command pulse over conductor 59B to cause the current setting of counters 52 to be printed out to show the total weight of both trucks of the car.

Marginal overspeed

Referring again to FIG. 1, following the described weighing of the front truck of the leading car, switch SW4 is closed momentarily by the leading wheel of the truck, momentarily operating marginal overspeed relay R9, thereby momentarily grounding marginal overspeed conductor 32 at its contacts 1, through back contacts 1 and 2 of relays R8 and R5, respectively. This momentary grounding actuates circuit 50 of FIG. 2, causing it to place an active signal on output conductor 69, subject to gate amplifier 45 being in open condition to maintain a gating potential on conductor 64, while weight-indicating pulses are passing between conductors 54 and 55. Concurrently an inactive signal potential appears on conductor 70.

The active signal on conductor 69 appears on conductor 73, the input to marginal overspeed "and" circuit 79 of FIG. 1A, while the inactive signal potential on conductor 70 appears on conductor 74, the input to "and" circuit 80. If the said actuation of circuit 50 occurs after the weighing has been completed, and the gate amplifier 45 has been opened responsive to a stop pulse on conductor 60, the gate potential has been removed from conductor 65 by circuit 45, which causes an active signal to appear on conductor 70 and its joined conductor 74, and causes an inactive signal to appear on conductor 69 and its joined conductor 73.

Referring to FIG. 1A, relays R10 to R13 are normally all restored, and the 110-volt A.C. potential on conductor 86 traverses contacts 11a, 10a, and back contact 12a, and through green signal lamp 15, to ground. Lamp 15 is normally lighted as a signal that the train of cars being weighed is not moving too fast for accurate weighing. If the active signal appears on conductors 69 and 73 as described, the "and" circuit 79 is prepared to pass a signal to conductor 76, subject to a gating signal on conductor 81. Such a signal is placed on conductor 81 each time a print command signal traverses conductor 59B (FIGS. 1 and 2) to reach the noted print-out apparatus by way of terminal 39' of FIG. 2. Thereupon, the coincidence of effective signals on conductors 73 and 81 effectively grounds (as through a relay driver in 79) conductor 76, operating relay 12, which locks operated at contacts 12c, to ground at back contact 11c. Contacts 12b prepare a circuit for relay 11, and member 12a open circuits and extinguishes green light 15, lighting the warning yellow light 16 as a signal that at least marginal overspeed of the train of cars has been reached. A branch circuit, in parallel with yellow lamp 16, extends over conductor 92 to ground through motor 14. Motor 14 is thereby operated to repeatedly open and close its contacts 20. Contacts 20 are serially included in a further branch circuit from conductor 92, through back contact 13c and thence to ground through horn 18. The horn 18 is operated intermittently by flashes by the noted opening and closing of contacts 20 as a signal along with yellow light 16 to the engineer of the train that the train should at least go no faster.

Error overspeed

When the front wheel of the leading truck of the leading freight car rolls across the final switch SW5, it momentarily actuates error overspeed relay R10, causing contacts 2 thereof to momentarily ground error-control conductor 33, thereby actuating error overspeed circuit 51. Subject to the gate amplifier still being in its described open condition to pass weigh pulses to counter 52, the noted gate signal is still held on branch conductor 63 leading to terminal C of circuit 51, such actuation places an active signal on conductor 71 and its joined conductor 75 leading to "and" circuits 82 and 83.

Then, when a print command signal is transmitted to the noted printer and a gate signal is responsively placed on conductor 81 by the printer, as described, "and" circuits 82 and 83 are both rendered active by the coincidence of signals on conductors 75 and 81. "And" circuit 83 sends a print-error signal over conductor 78 to the printer, causing it to print an error symbol alongside the printing out of the incomplete weight information from counter 52, or in place of such information, if desired.

"And" circuit 82 coincidentally effectively grounds conductor 101, operating relays 10 and 13 in parallel. Relay 10 locks ground from contacts 11c, onto its operating conductor 101, holding relays 10 and 13 locked operated. Back contact 10a extinguishes green light 15, or yellow light 16 (whichever one is lit) by removing the A.C. supply from conductor 84. Front contact 10a connects the A.C. supply to conductor 106, extending to the lever arm 13b. Lever arm 13a transfers motor and flasher conductor 92 to A.C. supply now on conductor 106; contacts 13b connect the A.C. supply on 106 steadily to horn 18, which sounds steadily on an audible overspeed error signal, and contacts 13c transfer the flasher contacts 20 from the now steadily operating horn 18 to red lamp 17, causing lamp 17 to operate as a flashing red-light visual overspeed error signal. The train engineer is thereby warned both audibly and visually that the train is travelling too fast for effective weighing. Usually, the train is slowed quickly enough that only one car weight is in error, wherefore only a single car needs later reweighing.

When the train has been slowed down to a speed below marginal overspeed, wheel-responsive relay R9 of FIG. 1 causes marginal overspeed circuit 50 of FIG. 2 to become activated over conductor 32 after gate amplifier 45 has finished its closed weight-count interval and has removed the gate condition from conductor 65 and its connected branches 61, 63, 64. Then, circuit 50 places an active signal condition on conductor 70, rather than on conductor 69. Thereby, when printer-controlled conductor 81 is next activated, (on the next print-out operation), coincidence occurs at "and" circuit 80 rather than at "and" circuit 79. Conductor 77 is thereby effectively grounded, operating clearout relay 11 through contacts 12b. Its contacts 11a temporarily interrupt the A.C. supply, and its contacts 11b and 11c open respectively the self-locking circuits of relays 10 and 12. Relays 10 and 12 accordingly restore, along with relay 13, which is in parallel with relay 10. Restoration of relay 12 opens the operating circuit of clearout relay 11, whereupon relay 11 also restores. Relays 10 to 13 are again all restored, and the green light 15 is again lit as a clear signal.

*Weighing subsequent trucks*

In FIG. 1, as the remaining wheel (or wheels, as the case may be) of the front truck of the lead car passes off the weigh rails WR, switches SW4 and SW5 are again actuated in succession, momentarily to actuate overspeed-signal relays 9 and 10 in succession as described, but without any particular effect in FIG. 2 because the weighing operation has then been completed.

Of the relays R1 to R10, only relay R3 remains operated, locked to ground by its contacts 1 to the back contact 1 of R1. When the leading wheel of the rear truck of the lead car momentarily closes switch SW1, relay R1 momentarily operates, operating relay R2, which locks to ground at back contact 3 of R4, as described. Also, at its back contact 1, R1 unlocks and restores relay R3, leaving relay R2 operated alone when R1 restores. The subsequent switch and relay operations incident to the second-truck passage occurs as described for the passage of the leading truck of the car.

Since, as stated, the minimum center-to-center distance between wheels of adjacent cars of the train is more than the indicated 6-foot separation between the first and third wheel-flange-operated switches SW1 and SW3, the final wheel of the rear truck of a car has already operated SW3 to initiate a weigh cycle as described, before the leading wheel of the front truck of the next following car reaches SW1 to perform the first operation leading to the weighing, as described, of such front truck.

The succeeding truck-weighing operations occur as described.

*Automatic recycling*

Recycling-control relay R8 is provided to insure resynchronization in the event that the weigh cycles undergone by the circuit structures of FIG. 2 fail, for any reason, to keep step with the car trucks passing the weigh station of FIG. 1. Lack of synchronism under intended normal conditions of operation are extremely rare, but should be guarded against to avoid a condition wherein the weights of the rear trucks of a large number of the cars of a train could be added to those of the front trucks of the respectively following cars, for example.

As an example of an occurrence which could cause a lack of synchronism, it should be noted that a small section of the flange of a wheel may be broken out without impairing the ordinary operation of the car, and without ordinarily rendering such wheel unable to operate any one of the switches SW1 to SW5. However, such a broken out wheel-rim section may fail to operate switch SW3 (for example if the broken-out rim section is the rim section presented to such switch).

From the foregoing described operation of the circuitry of FIG. 1, it is clear that relay R8 is not operated during the described passage of the weigh station by the front truck of a car since relays R4 and R6 are not then at any time concurrently in operated condition, with read relay R7 stored. However, when the front wheel of the rear truck of the same car reaches switch SW3 (after having actuated switches SW1 and SW2 as described), relay R4 is thereby momentarily operated as described. At this time, the weigh cycle described for the front truck of the car has count progressed to the described weigh-pulse interval, during which print-command relay R6 stands operated. Consequently, recycling-control relay R8 now operates whether or not synchronism exists, from ground at the front contact 3 of relay R4, now-closed contacts 2 of operated print-command relay R6, and contacts 2 of restored read relay R7. At its front contact 1, relay R8 closes a self-locking path from ground through contacts 2 of relay R5, front contact 1 of relay R8, and through contacts 2 of relays R6 and R7, to the winding of relay R8. Contacts 2 of R8 prepare to ground reset conductor 109 if relay R8 is still operated when relay R9 next operates.

Normally, synchronism exists. In that event, when the final wheel of the rear truck of the car momentarily operates relay R4 (with relay R3 again locked operated as described), read relay R7 operates momentarily, as described, to transmit a read signal over conductor 25 at its contacts 3. On this momentary operation of read relay R7, contacts 2 of R7 disconnect the locked reset-control relay R8, which thereupon restores and opens a further point in its locking circuit, whereby it remains restored.

But, if switch SW3 fails to be operated by the rear wheel of the rear truck of the car (as because that wheel has a defective or missing flange section which it presents to switch SW3), relay R4 fails to operate with R3 locked operated, causing failure of read relay R7 to operate. Relay R8 thus remains operated. Following this, with R8 still operated and locked, the described closure of switch SW4 to momentarily operate relay R9, momentarily places a negative 11-volt reset potential on reset conductor 109 through contacts 2 of relays R8 and R9. This momentary negative reset potential on conductor 109 resets read circuit 39 to normal conditions, and is extended through branch conductors 110 and 111 to reset respective circuits 44 and 45 to normal condition. The momentary negative reset potential on conductor 109 further transverses diode 114 to reach the joined-together conductors 47 to 49, thereby resetting weight-pulse counter 52 to zero, and returning circuits 50 and 51 to normal condition.

The described resetting of reset circuit 44 to normal condition, restores the normal negative inactive potential on conductor 59A, deactivating relay-driver amplifier 2 (FIG. 1), restoring print-command relay R6. Responsively an effective negative print-command signal is sent over conductor 59B to the noted print-out structure. A printing operation is thereby effected as described. However, since the weight-pulse counter has been reset to zero, the printed weight is zero, more particularly being "000,000" to correspond to the respective settings of individual counters 301 to 305 of decade counter 52.

If the foregoing failure of relay R4 to operate momentarily responsive to the passage of the rear wheel of a truck over SW3 occurs as the rear wheel of the front truck of a car passes SW3, relay R4 fails to operate with R3 locked operated, wherefore read relay R7 fails to operate momentarily at that time, whereby no front-truck weighing cycle is started. In this event, the front truck rolls off the weigh rails without being weighed, and without any printing operation with respect thereto having occurred. Next, the rear truck of the same car causes the described operations of relays R3, R4, and R7 to occur, to initiate a weighing operation which results in print-command relay R6 being preparatorily operated, as described for a front truck.

Assuming dual-mode operation to be in effect, the structure of FIG. 2 awaits a further weighing cycle to add its weight count to that standing on decade counter 52 before restoring print-command relay R6 to issue a print command. Thus, without recycle-control, such rear-truck weight would be carried over and added to the weight of the front truck of the next car. However, before the wheels of the trailing axle of the rear truck of the car reach and operate switch SW4, the front wheel of the leading truck of the next car (having actuated switches SW1 and SW2) momentarily activates switch SW3, momentarily operating recycle-control relay R8, which operates and locks as described. Shortly thereafter, and before the trailing wheel of the front truck of the next car operates switch SW3 to start the next weighing cycle, the trailing wheel of the noted rear truck of the car leaves the weigh rails WR, momentarily operating switches SW4 and SW5 in succession. Switch SW4 momentarily operates relay R9. An 11-volt negative resetting potential is thereby placed momentarily on reset conductor 109 through contacts 2 of relays R8 and R9. The circuit structure of FIG. 2 is responsively reset to normal condition, including the described resetting of decade counter to zero. Relay R6 responsively restores. It restores relay R8 at its contacts 2. At its contacts 3 relay R6 causes a negative pulse to be sent through the associated .1 micro-farad condenser CP and contacts 3 of relay R5, to print-command conductor 59B, causing the noted printer to print the noted current zero setting of decade weight-pulse counter 52, as described.

*Eliminating locomotive weight printing*

Locomotive-weight print out-eliminating relay R5 is provided, along with its associated circuit structure, to eliminate the printing of locomotive weights. The success of this eliminating action depends on the previously noted fact that each truck of a locomotive has at least one axle located at least six feet away from all other axles. A typical locomotive with two axles per truck may be assumed, the two axles being more than six feet apart, and with more than six feet between the rear axle of the front truck and the front axle of the rear truck. With this assumption, the operation resulting from a locomotive passing the weigh station may now be described.

When the front axle of the front truck of the locomotive approaches the weigh station (and with relays R1 to R10 all restored), SW1 is momentary operated, momentarily operating relay R1. Relay R2 responsively operates and locks to ground at back contact 3 of relay R4. Next switch SW2 is operated causing R3 to operate and, at its contacts 1, locks to ground at the back contact 1 of restored relay R1. Relays R2 and R3 are thus both now locked operated.

Before relay R1 is next operated to release locked relay R3 (in view of the noted inter-axle spacing, more than six feet), the associated front-axle wheel momentarily closes switch SW3 and thus operates relay R4. The back contact 3 of relay R4 opens the initial locking circuit of relay R2, but that relay remains locked operated through contacts 4 and 2 of relays R3 and R2, respectively. With relays R2, R3, and R4 all concurrently operated, eliminator relay R5 operates through contacts 1 of R2, contacts 2 of R3, and contacts 1 of R4. At contacts 1, relay R5 locks operated to ground at contacts 1 of relay R10; at its contacts 2 it opens a point in the locking circuit of relay R8; and, at its contacts 3, it disconnects print-command conductor 59B to preclude a print-out operation.

With relays R3 and R4 operated, read relay R7 is momentarily operated, through contacts 3 of R3 and contacts 2 of R4, and restores when opening of SW3 permits R4 to restore. The momentary operation of relay R7, issues a read command, causing the structure of FIG. 4 to undergo a weigh cycle as described. Such weigh cycle causes a signal to appear on conductor 59A which causes relay-driver A2 to operate relay R6 and to hold it operated until another weigh cycle occurs. Contacts 1 of relay R6 now provide an additional holding circuit for relay R5.

When the front axle of the front locomotive truck rolls off the weigh rails, relays R9 and R10 each operates in succession, but without signalling over either of over-speed conductors 32 and 33 since their signalling ground source is held open at contacts 2 of relay R5. Through its contacts 1 the operation of relay R10 momentarily opens a holding circuit for relay R5. However, relay's R5 holding circuit through contacts 1 of relay R6 continues to hold R5 energized.

When the wheels of the trailing axle of the front truck reach SW1, relay R1 is momentarily operated to unlock and restore relay R3. Then SW2 is again operated to reoperate relay R3 which again locks operated at its back contact 1.

When the noted trailing axle reaches switch SW3, such switch is momentarily operated to cause momentary operation of relay R4. Read relay R7 is responsively operated momentarily through contacts 3 of R3 and contacts 2 of R4. Contacts 3 of R7 momentarily unground and re-ground read conductor 25 to start a second weigh cycle. Such weigh cycle terminates with a signal over print-command conductor 59A which deactivates relay driver A2 to restore weigh command relay R6. No print command signal is transmitted, however, since conductor 59B is held disconnected at contacts 3 of R5. However, contacts 1 of relay R6 remove the secondary holding circuit of relay R5.

When the trailing axle of the leading truck of the locomotive rolls over switch SW5 and momentarily causes relay R10 to operate, contacts 1 of R10 open-circuit and restore eliminator relay R5, since R6 stands restored with its contacts 1 open.

The foregoing operations responsive to the passage of the front truck of the locomotive are repeated for the passage of the rear truck of the locomotive over the weigh station, whereby relay R5 acts again as described. Consequently, the locomotive passage is prevented from (1) printing the weight of the locomotive, from (2) signalling over either conductor 32 or 33, and from (3) energizing reset conductor 109, since open contacts 2 of R5 prevent recycle-control relay R8 from locking operated. The locomotive passage leaves relay R5 restored, and the other relays and circuit structure in readiness for the described freight-car weighing.

Manual reset

If switch 115 of FIG. 2 is opened, automatic reset will not take place. Opening conductor 200 prevents the reset circuit 44 from generating reset pulses automatically. The counter 52 will then add each count to the previous contained count and will continue to do so until reset.

Switch 117 is a manual reset switch used to generate a reset pulse manually. Depressing switch 117 connects conductor 112 to a manual reset source of −11 v. A reset signal on conductor 112 will appear on conductor 111, conductor 110, and conductor 109. The signal will also feed through the polarity sensing device 114 and appear on conductors 47, 48 and 49. The signal on conductor 111 resets the gate amplifier 45; the signal on conductor 110 resets the reset circuit 44; the signal on conductor 109 resets the read circuit 39; the signal on 48 resets the marginal overspeed circuit 50; the signal on conductor 49 resets the error circuit 51, and the signal on conductor 47 resets the counter 52. Manual reset 117 can be triggered at any time.

The read logic circuitry 39, the reset circuitry 44, the marginal overspeed circuitry 50, and the error circuitry 51, each comprise identical assemblies mounted on separate boards or cards and terminating in a series of terminal plug-in type connectors whereby the logic board or card may be plugged into a switchboard where connections are made to the respective terminals. By having different external connections to or between the different plugs, the behavior of the circuitry is correspondingly determined. The gate amplifier 45 likewise is a mounted assembly of electrical components having a number of plug type terminals whereby connections may be made to the components of the assembly by merely plugging the assembly into a switchboard, so that the functioning of the circuitry is determined by the connections that are made to the respective plug terminals at the switchboard. The plugs of the units 39, 44, 45, 50, and 51 have been designated by letters of the alphabet, the same letter in each case designating the same terminal in the assemblies of FIG. 2, and in the corresponding detail circuits of FIGS. 3–4. The external connections shown in FIG. 2 are the connections made to the respective terminals.

In the respective circuits of FIGS. 3 and 4, which will be presently described, the values of the capacitors are given in micromicrofarads. All diodes are of the type known as "IN34AS," and most of the transistors are of the PNP "2N404" type, the remainder (see Q3, FIG. 3) being NPN transistors.

A description will now be given of the circuitry in the block diagrams of FIG. 2 heretofore described.

Read card circuitry

The read circuit 39 (FIG. 2) is illustrated in detail in FIG. 3. At the left hand side of FIG. 3 are shown the various terminal plugs thereof, each bearing a designated capital letter within a circle to facilitate description. Corresponding letters designate the same terminals in FIG. 3 as they do in FIG. 2. Circuit 39 includes an inhibitor 150 which is to the left of the line 151, a monostable multivibrator 152 between the lines 151 and 153; an inverter 154 between the lines 153 and 155; an inverter 156 between the lines 155 and 157, and a bistable flip-flop circuit 158, otherwise known as a bistable multivibrator which is to the right of line 157.

Items Q1 through Q6 are transistors. Unless grounded, input terminal E is biased negative by the divider action of two 10K ohm resistors 160 and 161 (K stands for "thousand") connected from the −11 v. source at terminal K to ground. Transistor Q2 of flip-flop 152 is held "off" by the positive potential on its base from the +5.6 v. supply at terminal U through the associated 27K ohm resistor; transistor Q1, the other stage of the monostable multivibrator 152, is clamped "on" by the base current through an 18K ohm resistor 162 connected to the −11 v. line at terminal K; transistor Q3 is held "off" by the negative base-bias provided from the −20 v. supply at terminal F, through the associated 27K ohm resistor; transistor Q4 is held "off" by a bias voltage through the 27K ohm resistor 163 from the +5.6 v. supply on terminal U; transistor Q5 is held "off" through the associated 27K ohm resistor by the +5.6 v. bias on terminal U; and transistor Q6 is held "on" by its base connection to the −11 v. supply at terminal K, by way of the voltage divider comprising the 1K ohm and 7.5K ohm resistors associated with the collector of "off" transistor Q5. The reference for all voltages is ground at terminal T.

A read command, caused by an operation and a subsequent release of relay R7 and consequent closure of its contacts 3 (FIG. 1) abruptly changes the voltage on wire 25 (FIG. 1) which is connected to terminal E, from approximately −5.5 v. to zero. This is a positive step voltage. It transmits a short duration positive pulse through the 220 micromicrofarad condenser 166 and a 4.7K ohm resistor 167 connected to the anode of a coupling diode 168. The positive pulse is coupled by the diode 168 to the base of transistor Q1. This short pulse temporarily drives the transistor Q1 "off," thus triggering Q2 of the monostable multivibrator 152 momentarily "on." Q2 responsively generates a very short time duration positive pulse on its collector, which is coupled by diode 169 to terminal L. This pulse from L is used to "trigger" the reset circuit 44 (FIG. 2). This positive pulse is also coupled to transistor Q3 where it is inverted and appears at the collector of Q3 (inverter 154) as a negative pulse. This negative pulse appears at joined terminals H and D to serve as a reset pulse over conductor 40 (FIG. 2) for the digital clock 43. This negative pulse from Q3 also appears at the input of transistor Q4 where it is again inverted and appears on the collector of Q4 as a positive pulse. This positive pulse appears at terminal N and also at terminal P through the external connection 170 between these terminals. At terminal P the pulse is differentiated by a network consisting of a 220 mmfd. capacitor 172 and a 10K ohm resistor 173 into a positive and a negative peaked wave form. The positive peak is coupled by a diode 174 connected to the base of transistor Q6. The negative portion does not pass through this diode. The positive peaked pulse triggers the bistable multivibrator (flip-flop) 158. When the flip-flop is triggered Q6 is turned off and Q5 is turned on. When Q6 is turned off the collector voltage changes from ground potential to approximately −11 v. This negative step is coupled through a 4.7K ohm resistor 176 to terminal M. At terminal M the negative step is connected to terminal A by a wire 177 (at the switchboard) and then coupled through a 4.7K ohm resistor 167 to the anode of the diode connected to the base of Q1. This negative step on the diode biases the diode so that no trigger pulses can get into the input of the circuit. The network at the base terminal of Q1 is an inhibitor circuit and the negative step from the collector of Q6 is the inhibiting signal.

When the bistable MV158 is triggered a positive step is generated at the collector of Q5 when it turns on. This positive step is coupled through a 4.7K ohm resistor 180 and appears at terminal S. This positive step at terminal S is fed to the gate amplifier 45 (terminal R of FIG. 2) and serves as an enabling gate voltage. The gate amplifier generates a negative step voltage at its terminal R. This negative step is differentiated into a negative pulse by a network consisting of a 220 mmfd. capacitor 182 and 10K ohm resistor 183. The negative pulse is ignored by the flip-flop due to the diode.

After a time period determined by the digital clock and the gate amplifier a positive step appears at terminal R from conductor 61. The positive step is differentiated into a positive pulse by a network consisting of capacitor 182 and resistor 183. This positive pulse resets the multivibrator 158 by turning off the transistor Q5. The turn off of Q5 generates a negative step on the collector of Q5, which step is coupled through resistor 180 to terminal S. This negative step serves as an inhibit signal for the gate amplifier.

The turning off of transistor Q5 drives Q6 "on." The turn-on of Q6 generates a positive step voltage at the collector of Q6. The positive step is coupled through a resistor 176 to terminal M and then to terminal A. The positive step removes the bias on the diode at the base of Q1 and allows it to once again pass "read" signals.

The flip-flop 158 is manually reset by a signal at terminal V from conductor 109. The negative step is applied to the base of Q6 through the resistor 175. If Q6 is "off" the negative step will turn Q6 on. If Q6 is already "on" the negative step will be ignored.

Reset card circuit description

As previously stated the reset card is the same circuit as the circuit of FIG. 3, differing therefrom only in that the external connections to the various terminals are different. The connections to the terminals are as indicated in FIG. 2. There are no terminals L and C on the illustration of the reset card 44 in FIG. 2. They have been omitted from the drawing because they are not used in the reset card circuit. To produce the reset circuit 44 the connections to the circuitry of FIG. 3 are as indicated in FIG. 2, namely, the E terminal of 44 (FIG. 2) is connected by a conductor 200 and the reset switch 115 to the conductor 41 that leads to the L terminal of the read circuit 39. The S terminal of 44 is connected by conductor 58 to the dual terminal 204 of a switch 205, the blade 206 of which connects with the conductor 59A that leads to the print out terminal 39 of the switchboard via the network shown in FIG. 1, and return on conductor 59B. Another blade 207 of the same mechanical switch connects the terminal A of 44 selectively to the terminal M thereof to ground; Q6 is conducting due to the manual reset signal applied to terminal V; Q5 is "off" because Q6 is conducting. All voltages are referred to ground terminal T.

Single mode operation (truck weight)

For single mode operation the mode switch of FIG. 2 is in the position of the dotted lines. Terminal A is grounded and the print command signal is issued from the gate amplifier to the printer.

At the beginning of the weigh cycle a pulse is issued by the read card at terminal E. The positive pulse is differentiated by a 220 mmfd. capacitor and a 10K ohm resistor into a positive peaked pulse and a negative peaked pulse. The positive peaked pulse is fed through the diode D1 and appears on the base of Q1 turning it off. Turn off of Q1 triggers the monostable multivibrator. The negative peaked pulse cannot pass through the diode and therefore it is ignored by the MV. Triggering of the monostable multivibrator causes the generation of a very short time duration positive pulse on the collector of Q2. The positive pulse is coupled to the base of Q3 and the pulse appears as a negative pulse on the collector of Q3. The negative pulse is coupled to terminal H and serves as a reset pulse for the error card, marginal overspeed card, and decade counting units. Because terminal A is grounded, a reset pulse will be issued at terminal H for every auto reset pulse coming in at terminal E from the read card. A print command signal appears on terminal D from the gate amplifier for each weigh cycle. The signal is a positive step at the beginning of the count cycle followed by a negative step at the end of the count cycle. This signal is coupled to the base of transistor Q4 and appears on the collector of Q4 as a negative step followed by a positive step. This signal activates the bistable multivibrator. The output terminals S and M of the multivibrator are not connected to anything when in single mode; therefore, there is no need to consider the action of the multivibrator at this time.

Dual mode operation (car weights)

For dual mode operation, the mode switch is in the position shown by the solid lines. With no signals applied before a weighing operation the condition of the circuit is as described in the first part of the circuit description.

An autoreset pulse issued by the read card is coupled to terminal E of the reset card. The pulse is differentiated by a network made up of a 220 mmfd. capacitor and a 4.7K ohm resistor into a positive peaked pulse and a negative peaked pulse. The voltage at terminal A is approximately 0 volts due to conducting Q6. The positive peaked pulse feeds through diode 168 and appears at the base of Q1 driving it positive and triggering the monostable multivibrator. The negative peaked pulse will not feed through the diode 168 so it does not affect the multivibrator. Triggering the multivibrator generates a short time duration positive pulse on the collector of Q2. The pulse is coupled to the base of Q3 and appears on the collector of Q3 as a negative pulse. The pulse is then coupled to terminal H and serves as a reset pulse for the decade counting unit, marginal overspeed card, and error card. After the reset pulse is generated by the read card during the weigh cycle, a print command signal is generated by the gate amplifier at terminal D. The signal is a positive step followed by a negative step. The signal is coupled to the base of Q4 and appears at the collector of Q4 as a negative step followed by a positive step voltage. The signal is coupled to terminal N and then to R and P. After terminal R the signal is differentiated into a negative peaked pulse followed by positive peaked pulse by a 220 mmfd. capacitor and a 10K ohm resistor. The negative pulse is ignored because of the diode 178. From terminal P the signal is differentiated by a 220 mmfd. capacitor and a 10K ohm resistor. The negative pulse is ignored because of the diode 174.

Because Q6 is conducting, the positive peaked pulse is coupled through diode 174 and appears at the base of Q6 turning it off. The pulse at diode 178 does nothing because Q5 was already off. Turning "off" Q6 turns on Q5. Turning off Q6 causes the collector of Q6 to change from an 0 volt potential to approximately −11 volts. The −11 volt potential is coupled through a 4.7K ohm resistor, through the mode switch, to terminal A. The collector of Q5 changes from approximately −11 volts to 0 volts potential. This change is coupled to terminal S through a 4.7K ohm resistor. From terminal S the signal is coupled through the mode switch to the conductor 59A of FIG. 1 and serves as a print command signal. This positive step is ignored by the printer because the printer will react only on negative changes.

The next reset pulse is generated by the read card on the next weigh cycle and the pulse is fed to terminal E. The pulse does not get through the coupling circuit to the anode of 168 because of the negative voltage applied to 168 through a 4.7K ohm resistor. The negative voltage originates at the collector of Q6. The result is that no reset pulse will be issued at terminal H for the second weigh cycle. Another print command will be generated at terminal D of the reset card by the second read cycle. The signal is inverted by transistor Q4 and applied to the bistable multivibrator through terminals N, R and P. This signal is once again differentiated into negative peaked pulses followed by positive peaked pulses and applied to diodes 173 and 174. The negative peaked pulses are ignored by the diodes. The positive peaked pulses are applied to transistors Q5 and Q6. The pulse fed to the base of Q6 is ignored because Q6 is "off." The pulse fed to diode 179 turns "off" Q5 and triggers the multivibrator. The collector of Q5 changes from 0 volts to −11 volts and is coupled to terminal S through a 4.7K ohm resistor. From terminal S, the negative step is coupled through the mode switch to the conductor 59A of FIG. 1 to the relay driver A2 (amplifier), and serves as a print command. The printer will react to the negative voltage change. Triggering of the bistable at this point also causes the collector of Q6 to change from approximately −11 volts to 0 volts. This change is coupled to terminal M through a 4.7K ohm resistor then through the mode switch to terminal A. This removes the negative bias from the anode of 168 and allows the next reset pulse to feed through diode 168.

*Error card circuit description*

As previously stated, the error card contains the same electronic units connected to the respective terminals of the card in the same way as in FIG. 3. The difference between the error circuitry and the "read" circuit of FIG. 3 lies in the external connections, as indicated in FIG. 2. In the case of the error circuitry 51 the H and D terminals which are connected together by a conductor 220 (as in the case of the "read" circuitry 39) are in turn not connected to the conductor 40. The N and P conductors are, in both instances, interconnected by conductors 221 and 170. In the error circuitry 51 the A terminal is connected to ground by a conductor 222. The E terminal is connected to the error print out at the printer by the conductor 75. An impulse coming to the printer from this conductor actuates the printer to print E, or some other symbol indicative of error. The conductor 49 from the reset card (FIG. 3) leads to the V terminal.

In the stable state with no signals applied the circuit conditions are as follows:

Input terminal E is biased at −5.5 v. because of the divider action of the two 10K ohm resistors connected from the −11 v. supply at terminal K to ground terminal T; the transistor Q2 is "off" because of the bias from the +5.6 v. supply connected to terminal U applied through the 27K ohm resistor connected to the base of Q2; transistor Q1 is clamped "on" because of base current through an 18K ohm resistor connected to the −11 v. supply at terminal K; transistor Q3 is off due to bias from the −20 v. supply at terminal F applied through the 27K resistor; transistor Q4 is off due to bias from the +5.6 v. supply at terminal U applied through a 27K ohm resistor connected to the base of Q4; the junction of the 3.3K and 1.8K ohm resistors is clamped at ground by the diode 179 connected to terminal C and an *ov* signal from the gate amplifier card, the bistable MV has transistor Q6 conducting and Q5 cutoff. This is the normal state of the MV with no signals applied.

All voltages are referred to ground terminal T. An error signal is generated at terminal E by a contact closure. Contact closure shorts terminal E to ground generating a positive step of 5.5 volts. The positive step is differentiated into a positive pulse by a network consisting of a 220 mmfd. capacitor and a 4.7K ohm resistor and applied to the anode of a diode connected to the base of transistor Q1. The positive pulse turns off transistor Q1 and triggers the monostable MV. The monostable MV generates a positive pulse at the collector of Q2 of short time duration. The positive pulse is coupled to the transistor Q3 and is inverted. The pulse appears on the collector of Q3 as a negative pulse. The negative pulse is coupled through terminals H and D to appear at the junction of a 3.3K ohm and a 1.8K ohm resistor in the base circuit of transistor Q4. If the pulse arrives at this junction when the voltage at terminal C is 0 volts the pulse will not affect transistor Q4 because of the clamping action of the diode 179 and the 0 volt bias at the junction. If the pulse does not get through Q4, nothing further happens.

The voltage at terminal C changes from 0 volts to approximately −11 volts when a count cycle starts and remains at −11 v. during a count cycle. If an error input at E occurs after a counting cycle ends, the error signal ends at the input of transistor Q4. If an error signal occurs at E during a counting cycle, the voltage at terminal C will be at −11 v. When this occurs, the anode of diode 179 will be biased negative and therefore it will be cut off. The cut off diode 179 will no longer hold the junction of the 3.3K ohm resistor and the 1.8K ohm resistor at the input of transistor Q4 at ground (0 volt) potential. The negative pulse output of transistor Q3 will now be coupled to the base of transistor Q4. The transistor Q4 will invert the pulse and cause it to appear at the collector terminal of Q4. The inverted pulse which is now a positive pulse will be coupled through terminals N and P to the input terminal of a bistable multivibrator. The pulse will be differentiated by a network consisting of a 220 mmfd. capacitor and a 10K ohm resistor into a positive peaked pulse and a negative peaked pulse at the anode of diode 174. The positive peaked pulse triggers the flip-flop, by driving the base of Q6 in a positive direction and cutting it off. Cutting off Q6 turns on Q5. The negative portion of the peaked pulse at the anode of 174 is ignored by the diode. Triggering the flip-flop causes the collector of Q6 to change from approximately *ov* to approximately −11 volts. This action causes the output terminal M to go through approximately the same change. The change at terminal M is the output signal of the error card and is the signal used to trigger error indicating devices. The error card is reset by means of a negative pulse at terminal V generated by the reset card. This pulse is generated by the reset card at the beginning of every weigh cycle to insure that the bistable multivibrator 158 is set to Q5 cutoff and Q6 "on" at the beginning of every weigh cycle.

*Marginal overspeed*

The marginal overspeed circuitry is, as previously stated, identical with the error circuitry. It receives its initiating impulses over the conductor 32, as previously stated, and delivers its output to the conductors 69 and 70 that are connected through the switchboard to the "and" gates 79 and 80 of FIG. 1A.

If the marginal overspeed unit is entirely omitted, then the S terminal of the error logic card 51 is connected to the "and" gate 80 at the conductor 74 thereof and nothing is connected to the "and" gate 79. Under those circumstances, of course, there is no marginal overspeed signal, and the equipment for giving such signal is omitted.

*Gate amplifier circuit*

The gate amplifier circuit is illustrated in FIG. 4. The reference numerals thereon are the same as were heretofore used for similar parts thereof. The gate amplifier includes inverters 154A and 156A, similar to those of FIG. 3, a bistable multivibrator 158 and "and" circuit 240 and another inverter 156B.

At terminal V a negative voltage step is generated manually and applied to the base of transistor Q4. This negative step forces Q4 to be in a conducting state. Conducting Q4 insures a cut off of transistor Q3.

The stable state of the circuit with no signals applied is as follows:

Transistor Q1 is "off" due to the +5.6 volt bias applied through a 33K ohm resistor connected to terminal U; transistor Q2 is "on" due to the −11 volt bias at terminal K applied through a 2.2K ohm resistor and a 4.7K ohm resistor connected to the base of Q2; transistor Q4 is on since it was made to conduct by a manual reset signal and it is held "on" by the negative bias applied by the −11 volt supply at terminal K; transistor Q3 is "off" because Q4 is "on" and it is held "off" by the +5.6 volt bias at terminal U applied through a 27K ohm resistor to its base; transistor Q5 is "off" due to the 5.6 volt bias at terminal U applied through a 33K ohm resistor to its base; transistor Q6 is "off" because Q5 in its emitter circuit is "off"; transistor Q7 is part of a normal inverting amplifier and is always in a conducting state. Positive pulses are being applied to terminal L by the voltage to frequency converter and coupled to the base of Q7 by a 0.1 mfd. capacitor. The positive pulses are amplified and inverted by Q7 and applied to the base of Q6. The pulses cannot pass through Q6 because Q6 is held in an "off" condition as previously explained.

At an instant of time determined by the digital clock a positive step voltage is applied to terminal P. The positive step is differentiated into a positive peaked voltage by a 220 mmfd. capacitor and a 4.7K ohm resistor and applied to the anode of diode D1. If a weigh cycle has started, the voltage at terminal R will have previously changed from approximately −11 volts to approximately 0 volts. If the voltage at R is −11 volts the anode of D1 is biased negative then the positive peaked pulse will not pass through the diode. If a weigh cycle has begun, the voltage at terminal R will be approximately 0 volts and the positive peaked pulse will feed through diode D1 and will be applied to the base of Q4. The positive pulse on the base of Q4 turns it "off" and turns "on" Q3. Turn off of Q4 makes its collector voltage swing negative by approximately −11 volts. This change is coupled to the base of transistor Q5 and turns it "on." Turn on of transistor Q5 completes the emitter circuit for Q6. This allows Q6 to conduct. The negative pulses being applied to the base of Q6 are now inverted and appear as positive pulses on the collector of Q6. The pulses are coupled to terminal N and then fed to the counter.

The negative voltage step on the collector of Q4 is also coupled to terminal M and is fed to the read card, error card, and marginal overspeed card as a gate signal to show that a "count" cycle has begun.

The negative step which has been generated by the digital clock at terminal E is coupled to the base of Q1 and appears at the collector as a positive step. The positive step is coupled to the base of Q2 and appears at the collector as a negative step. The negative step is differentiated by a 220 mmfd. capacitor and a 10K ohm resistor into a negative peaked pulse. The negative peaked pulse is applied to the anode of diode D2 but it cannot get through the diode so the negative peaked pulse is ignored by the circuit.

At the end of the count cycle, as determined by the digital clock, a positive step is generated at terminal E. The positive step turns off transistor Q1 causing the collector voltage of Q1 to change from approximately 0 volts to approximately −11 volts. This negative step is coupled to Q2 causing it to turn "on." Turn on of Q2 causes its collector to change from approximately −11 volts to approximately 0 volts. This positive step is differentiated into a positive peaked pulse by a 220 mmfd. capacitor and a 10K ohm resistor. The positive peaked pulse is coupled by diode D2 to the base of Q3 forcing Q3 to turn off and triggering the bistable multivibrator. Q3 turning off generates a negative step on the collector of Q3. This negative step voltage is coupled to terminal S and then is coupled direct to 59A of FIG. 1 for single mode or to the reset card for dual mode. This negative step is the print command.

When Q3 turns off, Q4 turns on. Turn-on of Q4 generates a positive step on the collector of Q4. The positive step is coupled to the base of Q5 and turns Q5 off. Turn-off of Q5 opens the emitter circuit of Q6 and turns off Q6. Turn-off of Q6 removes the pulses from terminal N. The positive step on the collector of Q4 is also coupled to terminal M and serves as a signal to the read card, error card, and the marginal overspeed card that the read cycle has been completed. Also an inhibit signal, a negative step voltage, is issued from the read card to terminal R. This negative step voltage is applied to the anode of D1 and biases it negative to cut off start pulses from the clock until a weigh cycle is started at the read card.

The set of relays of FIG. 1 can, within the purview of the present invention, be replaced by logical circuitry employing "and" and "or" gates which preferably would be of the solid state type. Furthermore, while S1 through S5 have been indicated as mechanical switches, they can be replaced by corresponding electrical apparatus that responds to the position of the railroad car to actuate the circuitry involved.

It is to be noted that the circuits 20 of FIG. 2 are desensitizing circuits that eliminate false signals being induced due to extraneous noises or to electro-magnetic or electrostatic fields, as is set forth in my application Ser. No. 365,470.

The disclosure of my copending application Ser. No. 365,470 hereinbefore mentioned is herein incorporated by reference and that application may be referred to for further description of various parts of the circuits herein.

It is within the purview of the present invention to measure the voltage of the signal output amplifier VA of FIG. 1 (or of the output side of the filter F if no amplifier is used) in other manners which will tend to minimize errors that may arise from vibrations or oscillations of, or produced by, the load. For instance, the output voltage may be measured by averaging the maximum and the minimum voltages, or by taking a large number of instantaneous voltage measurements within the 0.2 second, and averaging those measurements. An average or sum of these measurements will very closely be proportionate to the average value of the signal being measured.

In compliance with the requirements of the patent statutes I have herein shown and described a preferred embodiment of the invention. It is, however, to be understood that the invention is not limited to the precise construction and circuitry herein shown, the same being merely illustrative of the principles of the invention. What is considered new and sought to be secured by Letters Patent is:

1. Apparatus for weighing successive railroad cars of a train in motion, said apparatus including a railroad track weigh section, members spaced from one another in a direction lengthwise of the weigh section for actuation in succession as the rolling equipment approaching the weighing position on the weigh section reaches predetermined successive positions for determining if the rolling equipment is a freight car to be weighed or a locomotive and for determining if the equipment is a freight car having trucks of two axles or of three axles, and a weight recorder controlled by said members.

2. Apparatus for weighing successive railroad cars of a train in motion, said apparatus including a railroad track weigh section, members spaced from one another in a direction lengthwise of the weigh section for actuation in succession as the rolling equipment approaching the weighing position on the weigh section reaches predetermined successive positions, weight recording means for recording the weights on the weigh section, and means controlled by the sequence of operation of the respective members for determining the operation of the weight recording means.

3. Apparatus as defined in claim 1, wherein there is provided means controlled by the sequence of operation of the respective members for actuating the weight recorder in response to a predetermined sequence of operation of the members and for preventing operation of the weight recorder in response to a different sequence of operation of said members.

4. A system for weighing railroad cars in motion on a railroad line which includes a weigh section forming an intermediate part thereof, comprising a series of control means spaced from one another lengthwise of the path of movement of rolling equipment moving on the line and respectively actuated by the wheels of the rolling equipment as the respective wheels reach the respective positions determined by the control means, and means determined by the sequence of operation of the control means to distinguish the cars to be weighed from other equipment rolling on said tracks.

5. A system for weighing railroad cars in motion on a railroad line which includes a weigh section forming an intermediate part thereof, comprising a series of control means actuated by the wheels of a car rolling onto the weigh station, a second control means actuated by an actuation of the first control means for weighing the truck of a car rolling along the weigh section, and means controlled from a portion of the line preceding the weigh section for preventing the second control means from being actuated by the first control means before the wheels of the trailing axle of a truck roll onto the weigh section.

6. Apparatus for weighing successive railroad cars of a train in motion, said apparatus including a railroad track weigh section, means controlled by the spacing between successive axles of rolling equipment approaching the weighing position of the weigh section for determining if the rolling equipment is a freight car to be weighed or a locomotive, and a weight recorder controlled by said means to record or not to record, depending upon the distance between such successive axles.

7. Apparatus for weighing successive railroad cars in motion and producing a record of the weights of the respective cars, said apparatus including a weigh section, weigh recording mechanism for recording the weight on said section at given times, resettable weigh means responsive to successive wheeled components of a car respectively reaching a weighing position on the weigh section to weigh such wheeled components, means for recording the total weight of all the wheeled components of each respective car, normally reset means operable subject to all of the wheeled components of the car having been weighed to reset the weigh means for weighing wheeled components of the following car, and synchronizing means operable subject to a failure of the weigh means to weigh all of the wheeled components of any car to reset the first mentioned weighing means for weighing the wheeled components of the respective following cars.

8. An apparatus as in claim 7 wherein each individual weighing includes less than all of the wheeled components of the car to be weighed so that a number of successive weighings constitute the total weight of the car.

9. An apparatus as in claim 7 wherein there is means for actuating the recorder the same of times for every car being weighed regardless of whether there was a failure of operation of all of the weigh means as to any of the wheeled components that were to be weighed, thereby recording such failure wherever it occurred, so that the subsequent weight recordings can be attributed to the appropriate subsequent cars weighed.

10. An apparatus as in claim 8 wherein there is means for actuating the recorder the same number of times for every car being weighed regardless of whether there was a failure of operation of all of the weigh means as to any of the wheeled components that were to be weighed, thereby recording such failure wherever it occurred, so that the subsequent weight recordings can be attributed to the appropriate subsequent cars weighed.

11. A system for weighing the trucks of railroad cars in motion on a railroad line which includes a weigh action forming an intermediate part thereof, comprising weight-signal structure coupled to the weigh section for signalling the weight of a truck rolling along the weigh section, first, second and third switches at respective spaced-apart locations along a rail of the line and each activated by each wheel rolling by its location, weight-indicating structure for indicating the weight upon the weigh section, and means including interlocking means connected to the switches for coupling the weight-signal structure to the weight-indicating structure only after all wheels of a truck have actuated each of the switches and have rolled onto the weigh section.

12. A system according to claim 11 wherein timing means is provided for again uncoupling the said weight-signal structure from the said weight-indicating structure while all wheels of the weighed truck are still on the said weigh section.

13. Apparatus for weighing successive railroad cars in motion which includes a weigh section, first resettable weigh means responding to the passage of the first truck of a car along the weigh section to weigh such truck, the truck means also responding to the passage of the second truck of the same car along the weigh section to weigh such truck, means for recording the total weight of both trucks of the car, normal reset means operable subject to both trucks of the car having been weighed to reset the weigh means for the weighing a first truck of the following car, and other reset means operable subject to a failure of the weigh means to weigh both trucks of any car to reset the weigh means for the weighing of the first truck of the following car.

14. A system according to claim 13, wherein the said recording means is caused to record a said failure of the said weigh means to weigh both trucks of any car.

15. A system for weighing railroad cars in motion on a railroad line which includes a weigh section forming an intermediate part thereof, comprising a series of control means spaced from one another lengthwise of the path of movement of rolling equipment moving on the line and respectively actuated by each of the wheels of the rolling equipment as the respective wheels reach the respective positions determined by the control means, and means determined by the sequence of operation of the control means to distinguish the cars to be weighed from other equipment rolling on said tracks and prevent the weighing of such other equipment.

16. A system for weighing the cars of a train in motion on a railroad line which includes a weigh section forming an intermediate part thereof, comprising interlocking means controlled by signals from at least two locations along a portion of the line in advance of the weigh section and one location of the line in advance of the weigh section and one location along a portion of the weigh section, weigh means controlled from the weigh station for weighing and recording the weight of each car rolling along the weigh section dependent upon a predetermined sequence of signals from said locations as determined by the inter-axle spacing for the cars to be weighed, and means responsive to a different sequence of signals when a locomotive is approaching and rolling along the weigh section for preventing the recording of the weight of the locomotive.

17. A method of weighing coupled railroad cars of vary lengths and numbers of axles while the cars are coupled together and in motion which comprises actuating different specific ones of a series of electric devices as the first axle of a car to be weighed passes predetermined spaced apart positions in its movement on the railroad track, reoperating each of the same series of devices each time each succeeding axle passes each of the same spaced apart positions on the track, and performing a weighing operation after the last axle of a number of successive axles has passed said locations and operated said devices if the operation of the series of devices was in certain sequence and skipping the weighing operation if the operation of the devices was in another sequence.

18. In a system for weighing railroad cars of varying lengths and numbers of axles while the cars are in motion by weighing one end of each car at a time, a railroad track including a weigh rail, a series of electric devices spaced from one another along the track, each device being in a position to be actuated once for each time that an axle passes over the track at said device, means controlled by the sequence of operation of said devices for discriminating as between axles of railroad freight cars and axles of certain locomotives, and means controlled by the sequence of operation of said same devices for determining whether the railroad truck to be weighed is a two-axle truck or a three-axle truck.

19. A structure as defined in claim 2 wherein there is provided means controlled by the sequence of operation of the respective members for actuating the weight recorder in response to a predetermined sequence of operation of the members and for preventing operation of the weight recorder in response to a different sequence of operation of said members.

20. A structure as defined in claim 2 wherein the spaced members are responsive to the passage of cars to be weighed past given points, said apparatus including reset means for resetting said apparatus to a predetermined condition, and means controlled by said members as a car reaches a predetermined position to actuate the reset means to reset the apparatus to the predetermined condition if it is not already in such condition, to synchronize the apparatus if it is out of synchronism.

21. A structure as defined in claim 20 wherein the predetermined position of the car that actuates the reset means is a position preceding its weighing position.

References Cited

UNITED STATES PATENTS

| 2,083,783 | 6/1937 | Haegele | 177—134 XR |
| 2,543,794 | 3/1951 | Mayer | 177—134 XR |
| 2,543,806 | 3/1951 | Roeser | 177—134 |
| 2,806,685 | 9/1957 | Vande Sande et al. | 177—10 |
| 3,106,259 | 10/1963 | Bensema et al. | 177—134 XR |

FOREIGN PATENTS

| 1,089,238 | 9/1954 | France. |
| 926,045 | 4/1955 | Germany. |
| 1,103,041 | 3/1961 | Germany. |
| 180,451 | 8/1962 | Sweden. |

ROBERT S. WARD, JR., *Primary Examiner.*

UNITED STATES PATENT OFFICE
CERTIFICATE OF CORRECTION

Patent No. 3,374,844  March 26, 1968

Edward Laurence Rogers

It is certified that error appears in the above identified patent and that said Letters Patent are hereby corrected as shown below:

Column 21, line 42, after "same" insert -- number --; line 59, for "action" read -- section --; column 22, line 47, for "vary" read -- varying --.

Signed and sealed this 24th day of June 1969.

(SEAL)
Attest:

Edward M. Fletcher, Jr.

Attesting Officer

WILLIAM E. SCHUYLER, JR.

Commissioner of Patents